(12) United States Patent
Buterbaugh et al.

(10) Patent No.: US 7,861,103 B2
(45) Date of Patent: Dec. 28, 2010

(54) DYNAMICALLY CONFIGURING OVERCURRENT PROTECTION IN A POWER SUPPLY

(75) Inventors: Jerrod K. Buterbaugh, Wake Forest, NC (US); Wallace G. Tuten, Georgetown, TX (US); Steven L. Vanderlinden, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 934 days.

(21) Appl. No.: 11/696,283

(22) Filed: Apr. 4, 2007

(65) Prior Publication Data

US 2008/0249666 A1    Oct. 9, 2008

(51) Int. Cl.
G06F 1/26 (2006.01)
(52) U.S. Cl. ..................................... 713/340; 361/93.9
(58) Field of Classification Search ................. 713/300, 713/340; 361/31, 93.9
See application file for complete search history.

(56) References Cited

U.S. PATENT DOCUMENTS

| | | | |
|---|---|---|---|
| 4,720,758 A * | 1/1988 | Winslow | 361/93.7 |
| 5,251,157 A | 10/1993 | Prather | |
| 5,297,014 A * | 3/1994 | Saito et al. | 363/21.17 |
| 5,831,807 A * | 11/1998 | Masannek et al. | 361/93.2 |
| 5,834,925 A | 11/1998 | Chesavage | |
| 5,999,421 A | 12/1999 | Liu | |
| 6,157,555 A | 12/2000 | Hemena et al. | |
| 6,320,771 B1 | 11/2001 | Hemena et al. | |
| 6,356,471 B1 | 3/2002 | Fang | |
| 6,664,657 B2 | 12/2003 | Hailey | |
| 6,785,827 B2 | 8/2004 | Layton et al. | |
| 6,803,679 B1 | 10/2004 | Luo et al. | |
| 6,836,099 B1 | 12/2004 | Amarillas et al. | |
| 7,058,833 B1 * | 6/2006 | Bremer et al. | 713/324 |
| 7,493,503 B2 * | 2/2009 | Aldereguia et al. | 713/300 |
| 2003/0122530 A1 | 7/2003 | Hikita | |
| 2003/0227730 A1 | 12/2003 | Limura et al. | |
| 2004/0193926 A1 | 9/2004 | Vogman | |
| 2006/0098368 A1 | 5/2006 | Gentillet et al. | |

FOREIGN PATENT DOCUMENTS

WO    WO 01/24338 A1    4/2001

OTHER PUBLICATIONS

Saunders; Automatic Multi-Level Overcurrent Protection Circuit; Document No. AAA85A061772; Endicott; Pub Name TDB 08-85, p. 1054-1056.
Radcliffe; Continuously Adjustable Power Supply Overcurrent Protection Circuit; Document No. AAA86A061626; Endicott; Pub Name TDB 07-86, p. 806.
Hochdoerfer; Processor Power Control and Monitoring System; Document No. AAA88A062064; Endicott; Pub Name TDB 12-88, p. 198-201.

* cited by examiner

Primary Examiner—Thuan N Du
(74) Attorney, Agent, or Firm—Brandon C. Kennedy; Cynthia G. Seal; Biggers & Ohanian, LLP

(57) ABSTRACT

Methods, apparatus, and products are disclosed for dynamically configuring overcurrent protection in a power supply for components of an electrically powered system, including summing by a master service processor, during powered operation of the system, the present power requirements of components presently installed in the system and setting by the master service processor an overcurrent trip point of the power supply in dependence upon the sum of the present power requirements of the components.

15 Claims, 6 Drawing Sheets

DYNAMICALLY CONFIGURING OVERCURRENT PROTECTION IN A POWER SUPPLY

BACKGROUND OF THE INVENTION

1. Field of the Invention

The field of the invention is data processing, or, more specifically, methods, apparatus, and products for dynamically configuring overcurrent protection in a power supply.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of computer technology that has seen substantial advances is power supply technology. Computer power supplies are designed to meet the maximum load expected in a given product installation. If the product has multiple option bays (e.g., PCI adapter slots or drive bays), then the power supply must be capable of powering the product with all system slots populated with devices having the maximum wattage allowed in any given slot. Furthermore, overcurrent protection is designed to shut down the outputs of these power supplies based on the maximum current output required to support a fully-loaded product. If the system slots in a product are not fully loaded, the actual maximum current requirements can be well below the capacity of the power supply, and the overcurrent protection is obviously even higher. In the case of a fault (e.g., high impedence short circuit to ground of the power supply output), there can be a large amount of reserve current capacity in the power supply in a lightly-loaded product. This "reserve" or unused current capacity (as defined by the overcurrent trip point) can continue to feed a short-circuit and cause heat build-up and eventually a fire if not detected by the user of the product. Also, in products where two or more supplies are provided to source power redundantly to a product, the reserve current can be much higher than the current required by even a maximally-configured system.

SUMMARY OF THE INVENTION

Methods, apparatus, and products are disclosed for dynamically configuring overcurrent protection in a power supply for components of an electrically powered system, including summing by a master service processor, during powered operation of the system, the present power requirements of components presently installed in the system and setting by the master service processor an overcurrent trip point of the power supply in dependence upon the sum of the present power requirements of the components.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
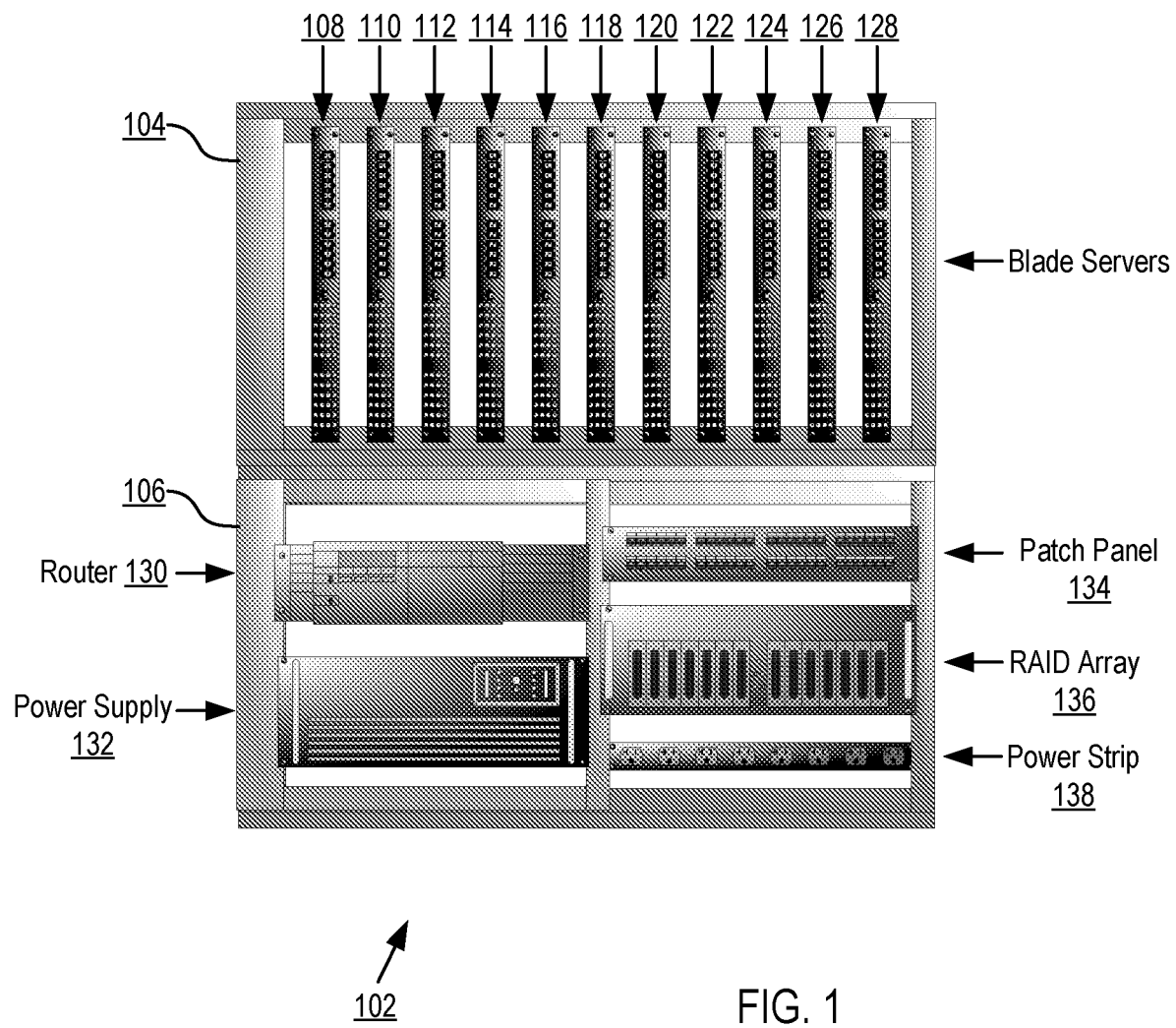
FIG. 1 sets forth a front view of an exemplary electrically powered system in which overcurrent protection is dynamically configured according to embodiments of the present invention.

Exemplary methods, systems, and products for dynamically configuring overcurrent protection in a power supply according to embodiments of the present invention are described with reference to the accompanying drawings, beginning with FIG. 1. FIG. 1 sets forth a front view of an exemplary electrically powered system (102) in which overcurrent protection is dynamically configured according to embodiments of the present invention. The system of FIG. 1 operates generally to dynamically configure overcurrent protection in a power supply according to embodiments of the present invention by summing by a master service processor, during powered operation of the system, the present power requirements of components presently installed in the system, and setting by the master service processor an overcurrent trip point of the power supply in dependence upon the sum of the present power requirements of the components.

Any electrically powered system or apparatus that includes a power supply and components with individual power requirements can be improved for dynamic configuration of overcurrent protection according to embodiments of the present invention. Examples of such electrically powered systems include electrical appliances such as copiers, computer peripherals such as monitors and printers, portable and embedded systems, desktop computers, server systems such as installations of blade servers, and supercomputers—which have substantial power management challenges. The example electrically powered system (102) of FIG. 1 includes two cabinet bays (104, 106), each of which includes several components, each component having a power requirement. Cabinet bay (104) contains eleven blade servers (108-128), components of the electrically powered system, each of which is powered by a power supply (132). Cabinet bay (106) contains the power supply (132) for the electrically powered system (102) and a data communications network router (130), another component of the electrically powered system, which also is powered by the power supply (132). Cabinet bay (106) also contains additional components of the electrically powered system: a patch panel (134), a Redundant Array of Independent Disks ('RAID') (136), and a power strip (138). The RAID array (136) is also powered by the power supply (132).

In the example of FIG. 1, the power supply (132) has a master service processor that is programmed to dynamically configure overcurrent protection. Overcurrent is the condition where the output current of the power supply measured in amperes is greater than an overcurrent trip point. Output current from the power supply may be too high in this sense, an overcurrent, because of an overload, short circuit, or ground fault. An overcurrent condition, left unprotected, will cause an excessive or dangerous temperature rise in conductors of the power supply and possibly in other components of the system. The power supply contains overcurrent protection circuitry which operates against an overcurrent trip point. The overcurrent trip point is a variable setting of a maximum amount of electrical current to be output from the power supply. The overcurrent protection circuitry tracks the output current of the power supply and compares it to the overcurrent trip point. If output current exceeds the overcurrent trip point, the overcurrent circuit shuts down the power supply.

Overcurrent protection in a power supply of a system according to embodiments of the present invention is 'dynamically configured' in the sense that such overcurrent protection is configured during actual powered operation of the system—automatically by a processor of the system itself—as opposed to being configured statically during manufacturing or statically configured by user-modifiable system parameters. That is, systems according to embodiments of the present invention support variable overcurrent trip points, trip points amenable to change during powered operation of the system. Moreover, such systems carry out dynamic configuration of overcurrent protection in the sense that they sum actual present power requirements of system components dynamically during powered operation of the system.

The arrangement of components in the example system of FIG. 1, the power supply, RAID array, servers, and other devices making up the exemplary system illustrated in FIG. 1, are for explanation, not for limitation. Electrically powered systems useful for dynamically configuring overcurrent protection in a power supply according to various embodiments of the present invention may include additional servers, routers, other devices, not shown in FIG. 1, as will occur to those of skill in the art. Various embodiments of the present invention may be implemented on a variety of hardware platforms in addition to those illustrated in FIG. 1.

Figure 2:
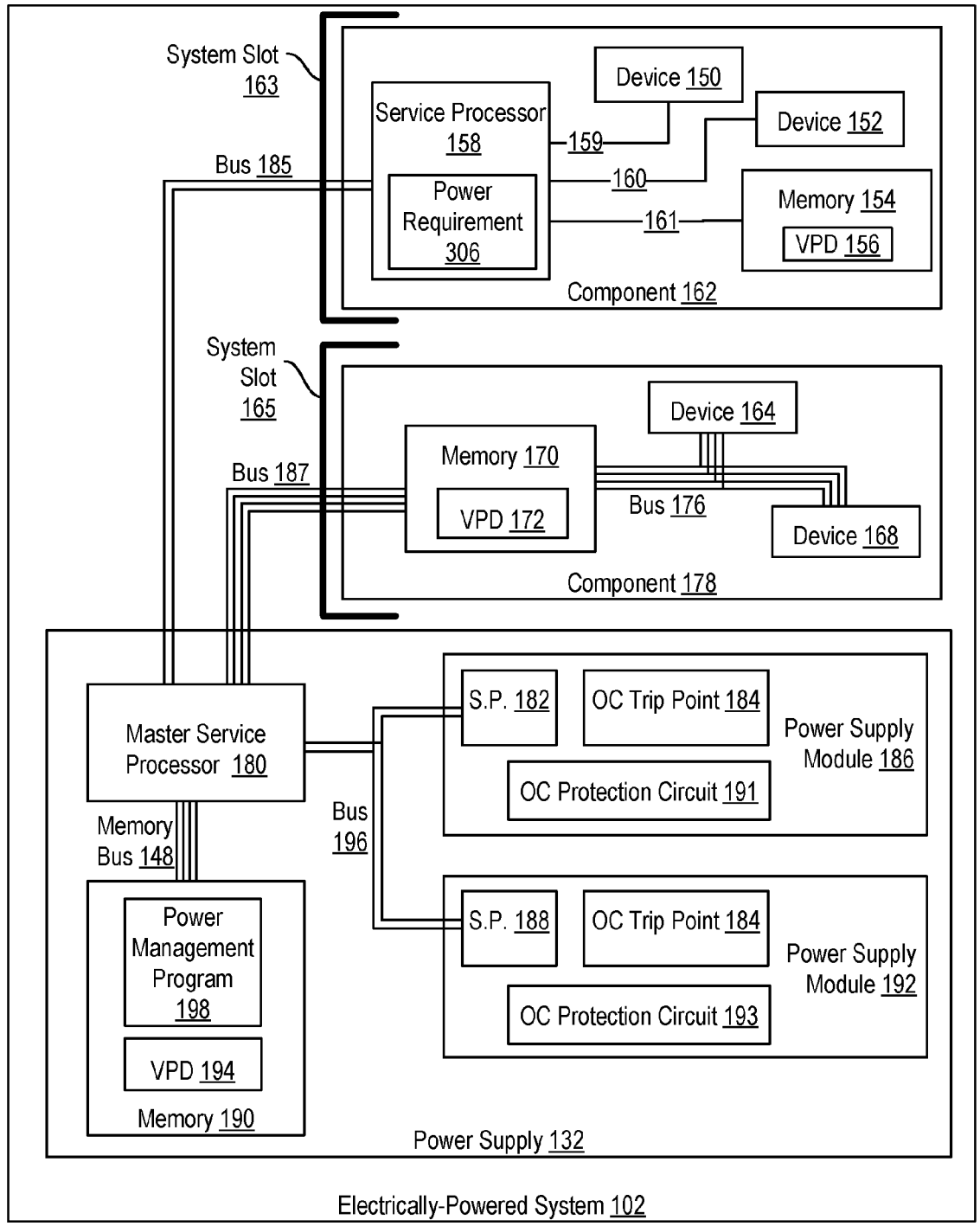
FIG. 2 sets forth a functional block diagram of an exemplary electrically powered system that dynamically configures overcurrent protection in a power supply for components of the system according to embodiments of the present invention.

For further explanation, FIG. 2 sets forth a functional block diagram of an exemplary electrically powered system (102) that dynamically configures overcurrent protection in a power supply (132) for components (162, 178) of the system according to embodiments of the present invention. The system of FIG. 2 includes a power supply (132) that supplies electrical power to the components of the system. The power supply includes a master service processor (180) connected by a memory bus (148) to computer memory (190) in which is disposed a power management program (198), a module of computer program instructions that carries out dynamic configuration of overcurrent protection by causing the master service processor (180) to sum, during powered operation of the system, the present power requirements of components (162, 178) presently installed in the system and set an overcurrent trip point (182, 188) of the power supply (132) in dependence upon the sum of the present power requirements of the components. The computer memory (190) and the power management program are shown as a separate device connected to the master service (180) processor through a bus (148). Readers will recognize, however, that such devices may be implemented as an embedded system in which the computer memory (190), the power management program (198), and the master service processor (180) are all implemented as a single device.

In addition to the master service processor (180), the system of FIG. 2 includes three other service processors, one service processor (158) installed in a component (162) of the system and two service processors (182, 188) in the power supply. A service processor is a separate, dedicated internal processor often located on the motherboard of a system component such as a server, on a PCI card, on the chassis of a blade server or telecommunications platform, or in the chassis of a power supply module. The service processor operates independently from a system's CPU and operating system, even if the CPU or OS is locked up or otherwise inaccessible. Service processors are often used to monitor a component's on-board instrumentation (temperature sensors, CPU status, fan speed, voltages, current, power requirements), provide remote reset or power-cycle capabilities, enable remote access to basic input/output system (BIOS) configuration or administrative console information, and, in some cases, provide keyboard and mouse control.

A 'master service processor,' as the term is used in this specification, is a service processor that carries out dynamic configuration of overcurrent protection according to embodiments of the present invention. In carrying out dynamic configuration of overcurrent protection according to embodiments of the present invention, a master service processor communicates with other components of an electrically powered system, including other service processors optionally installed on various components of the system. Although there are several service processors (158, 182, 188) in the present example, such configuration of components and power supply modules is only for ease of explanation, not a limitation of the present invention. There is no requirement in the present invention—except for the master service processor—that any of the components or power supply modules of an electrically powered system that dynamically configures overcurrent protection must have a service processor.

The power supply (132) in this example is configured to reduce the risk of interruption of its supply of power to components of the system by inclusion of two power supply modules (186, 192), each of which is provided with the same overcurrent trip point (184). During normal powered operation of the system, one of the two power supply modules is assigned to provide power to components of the system. If the assigned power supply module fails, then the responsibility for providing power is transferred to the other power supply module. Both power supply modules will provide overcurrent protection if current demand from either exceeds the overcurrent trip point.

The master service processor (180) is connected to the service processors (182, 188) in the power supply modules (186, 192) by bus (196), and the master service processor (180) is connected to the service processor (158) in component (162) by bus (185). Both bus (196) and bus (185) are service-level buses for out-of-band communications of data and instructions between a master service processor and other service processors. Examples of bus types useful as implementations of bus (196) and bus (185) include:

The I²C bus, a serial computer bus invented by Philips that is used to for low-speed communications with peripheral components of a system. The name stands for Inter-Integrated Circuit and is pronounced I-squared-C or sometimes as I-two-C.

The ACCESS.bus ('A.b'), a peripheral-interconnect computer bus developed by Philips in the early 1990s. It is similar in purpose to USB, in that it allows low-speed devices to be added or removed from a computer on the fly, that is, hot swapped.

The System Management Bus ('SMBus'), another two-wire bus used for low-bandwidth communications among components of a system, especially power related chips such as a laptop's rechargeable battery subsystem, as well as other components such temperature sensors and lid switches.

The Intelligent Platform Management Bus ('IPMB'), a protocol of the Intelligent Platform Management Interface ('IPMI') specification, originally developed by Dell, HP, Intel, and NEC, defines a set of common interfaces to computer hardware and firmware designed to monitor system health and manage the system. The IPMB is an enhanced implementation of $I^2C$.

The Universal Serial Bus ('USB'), a serial bus standard for communications among hot swappable peripheral devices. Originally designed for computers, its flexibility has placed USB buses on video game consoles, PDAs, portable DVD and media players, cellphones; and even devices such as televisions, home stereo equipment, digital audio players, car stereos, and portable memory devices.

Others as will occur to those of skill in the art.

In the example of FIG. 2, the master service processor may detect a change in a configuration of the components of the electrically powered system, and sum the present power requirements of components (162, 178) and set an overcurrent trip point (182, 188) as a response to detecting the change in configuration. The master service processor may detect a change in configuration by detecting hot swapping of components of the system. Hot swapping or hot plugging is the ability to remove and replace components of an electrically powered system or machine, typically a computer, while the system is operating. Once the appropriate software is installed on the computer, a user can plug and unplug the component without rebooting. Examples of hot swapping functionality useful in systems that dynamically configure overcurrent protection according to embodiments of the present invention include the Universal Serial Bus ('USB') and the ACCESS.bus ('A.b').

Other protocols that now support hot swapping include:

PCMCIA, a peripheral interface designed for laptop computers. Originally designed for memory expansion, but now used on peripheral components of many kinds, including network cards, modems and hard disks.

The IEEE 1394 interface, Apple's FireWire™, also defines a backplane interface, and is a serial bus interface standard, offering high-speed communications and isochronous real-time data services.

Fibre Channel, a gigabit-speed network technology primarily used for storage networking. Fibre Channel is standardized in the T11 Technical Committee of the InterNational Committee for Information Technology Standards ('INCITS'), an American National Standards Institute accredited standards committee.

Serial Advanced Technology Attachment ('SATA'), a computer bus technology primarily designed for transfer of data to and from a hard disk.

Serial Attached SCSI ('SAS'), is a serial communication protocol for direct attached storage ('DAS') devices.

Hot swapping does not necessarily require a service processor on a hot swappable component. In the example of FIG. 2, either bus (185) or bus (187), or both of them, can be configured to support hot swapping of components. Moreover, either component (162) or component (178), or both of them, may be hot swappable.

In the example of FIG. 2, the service processor (158) on component (162) may sum into a power requirement (306) for the component (162), power requirements of devices (150, 152) in the component (162). Although component (162) is shown in this example for clarity of explanation with only two devices (150, 152), readers will recognize that in fact a component in a system that dynamically configures overcurrent protection according to embodiments of the present invention, such as, for example, a blade server or a router, may contain many individual electronic devices, such as, for example, computer processors, computer memory modules, disk drive controllers, input/output adapters, and so on, as will occur to those of skill in the art. Each such device may have its own power requirement, so that the sum of the power requirements of the devices in the component represents the present power requirement of the component. The service processor may sum the power requirements of the devices by polling the devices themselves for their power requirements, as for example by data communications through buses (159, 160). The service processor may sum the power requirements of the devices by retrieving the power requirements from previously stored information in computer memory (154). And the service processor may sum the power requirements of the devices by other means as will occur to those of skill in the art. When a master service processor (180) sums the present power requirements of components presently installed in the system, the service processor (158) on component (162) may provide to the master service processor its summed power requirement (306) as the present power requirement of component (162).

The master service processor (180) in the example of FIG. 2 may detect the presence of a component in a system slot, for example, by detecting a hot swap of the component into the system slot (163, 165), and then the master service processor may sum the present power requirements of components presently installed in the system by summing a predefined power requirement for each system slot. A 'system slot' as the term is used in this specification refers to any hardware infrastructure for connecting hot swappable components of a system to the underlying hardware framework of the system itself, including, for example, connector sockets in blade server racks, USB connectors, and any edge connector for a printed circuit board, as well as others as may occur to those of skill in the art. The predefined power requirement for each system slot may be installed in computer memory (190) in table form, for example, in a table similar to Table 1.

TABLE 1

Predefined Power Requirements Of System Slots

| Slot | Power Requirement (Watts) |
|---|---|
| 1 | 40 |
| 2 | 40 |
| 3 | 40 |
| 4 | 75 |
| 5 | 75 |
| 6 | 75 |

Using Table 1, the master service processor (180) may, upon detecting a hot swap into a particular system slot, retrieve the power requirement for the slot from Table 1, and use the retrieved power requirement when summing the present power requirements of components presently installed in the system.

In addition to summing power requirements retrieved from components or retrieved from predefined storage, the master service processor also may retrieve vital product data ('VPD') from a component in a system slot. VPD is information about a component that allows the component to be administered at a system level. VPD may be stored on the component itself (156, 172), in memory connected to the master service processor (194), or on a disk drive or other memory as may occur to those of skill in the art. VPD may include, for example, a product model number of a component, a serial number uniquely identifying a component, product release level, maintenance level, and other information specific to a type of component. Vital product data can also include user-defined information, such as the building and department location of a component. The collection and use of vital product data allows the status of a network or computer system to be understood and service provided more quickly. In this example, VPD (156, 172, 194) includes a power requirement for a component (162, 178). Using VPD, the master service processor (180) may, upon detecting a hot swap into the system of a particular component or type of component, retrieve the power requirement of such a component from VPD, and use, as the power requirement for the component in the slot, that retrieved power requirement from the component's VPD when summing the present power requirements of components presently installed in the system.

Having summed the present power requirement of components presently installed in the system, the master service processor (180) then sets an overcurrent trip point (184) of the power supply (132) in dependence upon the sum of the present power requirements by calculating the overcurrent trip point for the power supply in dependence upon the sum and providing the overcurrent trip point to the power supply. The master service processor may provide the overcurrent trip point to the power supply through an out-of-band network such as the one illustrated, for example, and discussed above with reference to bus (196) in FIG. 2. The master service processor may calculate the overcurrent trip point for the power supply in various ways, including, for example:

In a system where more than one power supply module is run in parallel to provide power to the system, dividing the sum of the power requirements by the number of power supply modules. If two modules are providing power in parallel, for example, and the total power requirement is 500 watts, then calculate an overcurrent trip point of 250 watts and provide that value of overcurrent trip point to both power supply modules.

In a system with multiple power supply modules that uses only one power supply module at a time to provide all power to the system and reserves the other power supply modules as backups, calculate the overcurrent protection point as 110% of the sum of the present power requirements of components presently installed in the system, and provide that value of overcurrent trip point to the power supply modules.

Figure 3:
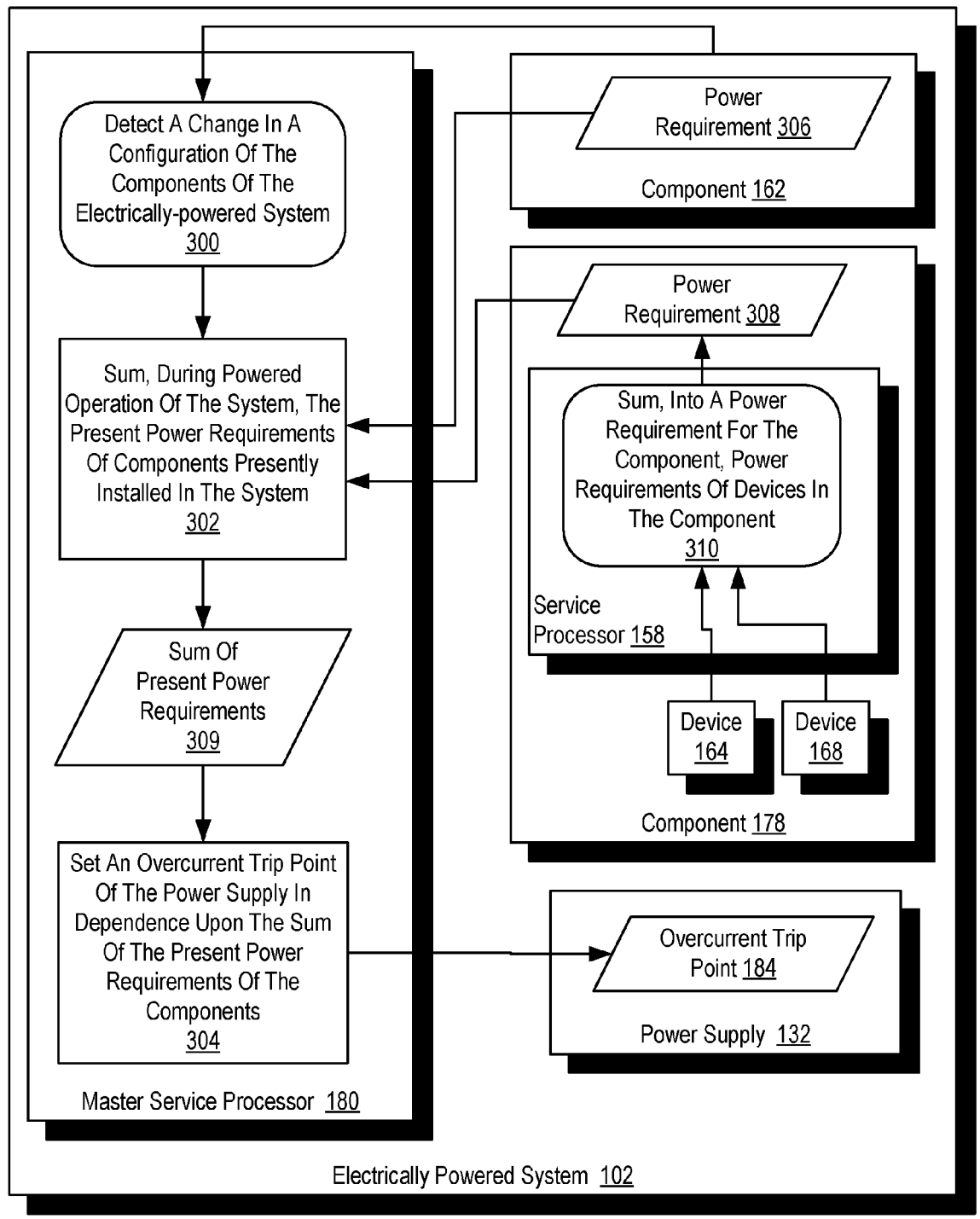
FIG. 3 sets forth a flow chart illustrating an exemplary method for dynamically configuring overcurrent protection in a power supply for components of an electrically powered system according to embodiments of the present invention.

For further explanation, FIG. 3 sets forth a flow chart illustrating an exemplary method for dynamically configuring overcurrent protection in a power supply (132) for components (162, 178) of an electrically powered system (102) according to embodiments of the present invention that includes detecting (300) by a master service processor (180) a change in a configuration of the components of the electrically powered system. The detecting step in this example is represented as optional. It is entirely within the scope of the present invention for a system to dynamically configure overcurrent protection in a power supply without detecting changes in configuration of components. A system could, for example, periodically poll all the component slots in the system for power requirements. When a system does detect changes in configuration, detecting changes in configuration may be carried out by detecting hot swapping of components into and out of the system configuration as described above with reference to FIG. 2. In addition, when a system does detect changes in configuration, the system can then sum the present power requirements of components presently installed in the system and set an overcurrent trip point of the power supply in response to detection of changes in configuration of the components of the system.

The method of FIG. 3 also includes a further optional step of summing (310) by a service processor (158) of a component (178), into a power requirement (308) for the component (178), power requirements of devices (164, 168) in the component. Summing power requirements of devices in a component by a service processor of the component is said to be optional because there are other ways to obtain the power requirements of the component. A master service processor may obtain the power requirement of a component from VPD of the component, for example, with the VPD stored either on the component itself or elsewhere. The service processor (158) may sum the power requirements of the devices by polling the devices themselves for their power requirements, as for example by data communications through buses (159, 160 on FIG. 2). The service processor may sum the power requirements of the devices by retrieving the power requirements from previously stored information in computer memory (154 on FIG. 2). And the service processor may sum the power requirements of the devices by other means as will occur to those of skill in the art. When a master service processor (180) sums the present power requirements of components presently installed in the system, the service processor (158) on component (178) may provide to the master service processor its summed power requirement (308) as the present power requirement of component (178).

The method of FIG. 3 also includes summing (302) by a master service processor (180), during powered operation of the system (102), the present power requirements (306, 308) of components (162, 178) presently installed in the system. The master service processor may sum the power requirements of the components (162, 178) by polling the components for their power requirements, as for example, by use of data communications through buses (185, 187 on FIG. 2). Components can share virtual memory space with the master service processor, and the master service processor can poll for component power requirements by reading the power requirement for a component from a predefined memory location. In this example, component (162) is configured with its own power requirement (306), which component (162) can provide to the master service processor (162) when polled. Component (178) has its power requirement (308) available for the master service processor upon polling, which was derived by summing the power requirements of devices (164, 168) in component (178).

The method of FIG. 3 also includes setting (304) by the master service processor (180) an overcurrent trip point (184) of the power supply (132) in dependence upon the sum (309) of the present power requirements of the components. Setting an overcurrent trip point is described in more detail below with reference to FIG. 6.

Figure 4:
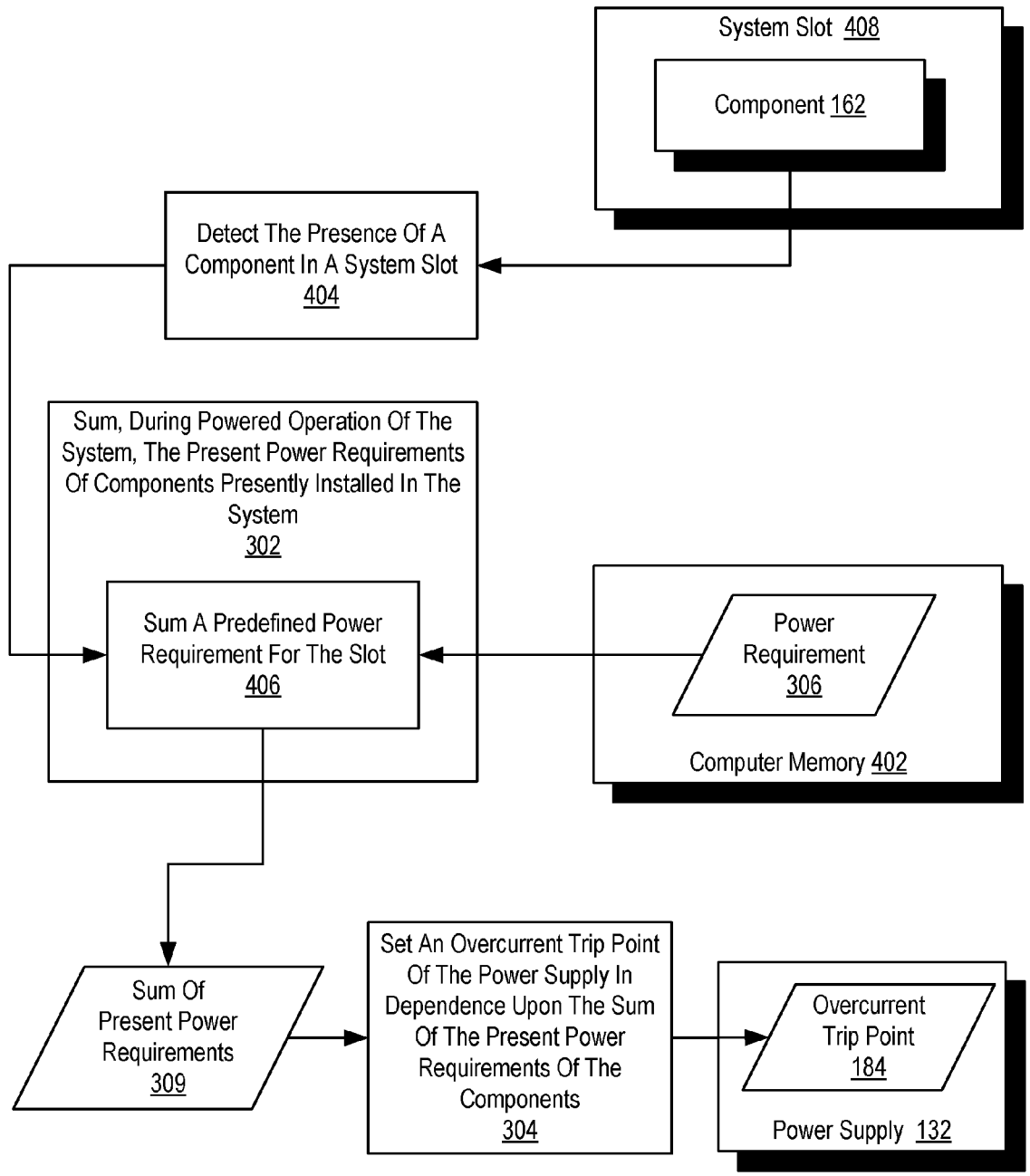
FIG. 4 sets forth a flow chart illustrating a further exemplary method for dynamically configuring overcurrent protection in a power supply according to embodiments of the present invention.

For further explanation, FIG. 4 sets forth a flow chart illustrating a further exemplary method for dynamically configuring overcurrent protection in a power supply according to embodiments of the present invention. The method of FIG. 4 is similar to the method of FIG. 3, including, as it does, summing the present power requirements of components presently installed in the system, setting an overcurrent trip point of the power supply, and so on, all of which operate in a manner similar to that described above for the method of FIG. 3. The method of FIG. 4, however, also includes detecting (404) the presence of a component (162) in a system slot (408). An electrically powered system may detect the presence of a component in a system slot by polling the slot for an indication of component presence, by recording the presence in the slot of a plug-and-play component at boot time, by detecting a hot swap of a component into the system slot, or by other methods as will occur to those of skill in the art.

An additional difference between the method of FIG. 3 and the method of FIG. 4 is that, in the method of FIG. 4, summing (302) the present power requirements of components presently installed in the system is carried out by summing (406) a predefined power requirement (306) for the slot (408). A predefined power requirement for each system slot may be installed in computer memory (402) in table form, for example, in a table similar to Table 1. Using a table similar to Table 1, the master service processor (180) may retrieve from such a table the power requirement for each system slot presently occupied by a component, and use the retrieved power requirements when summing the present power requirements of components presently installed in the system.

Figure 5:
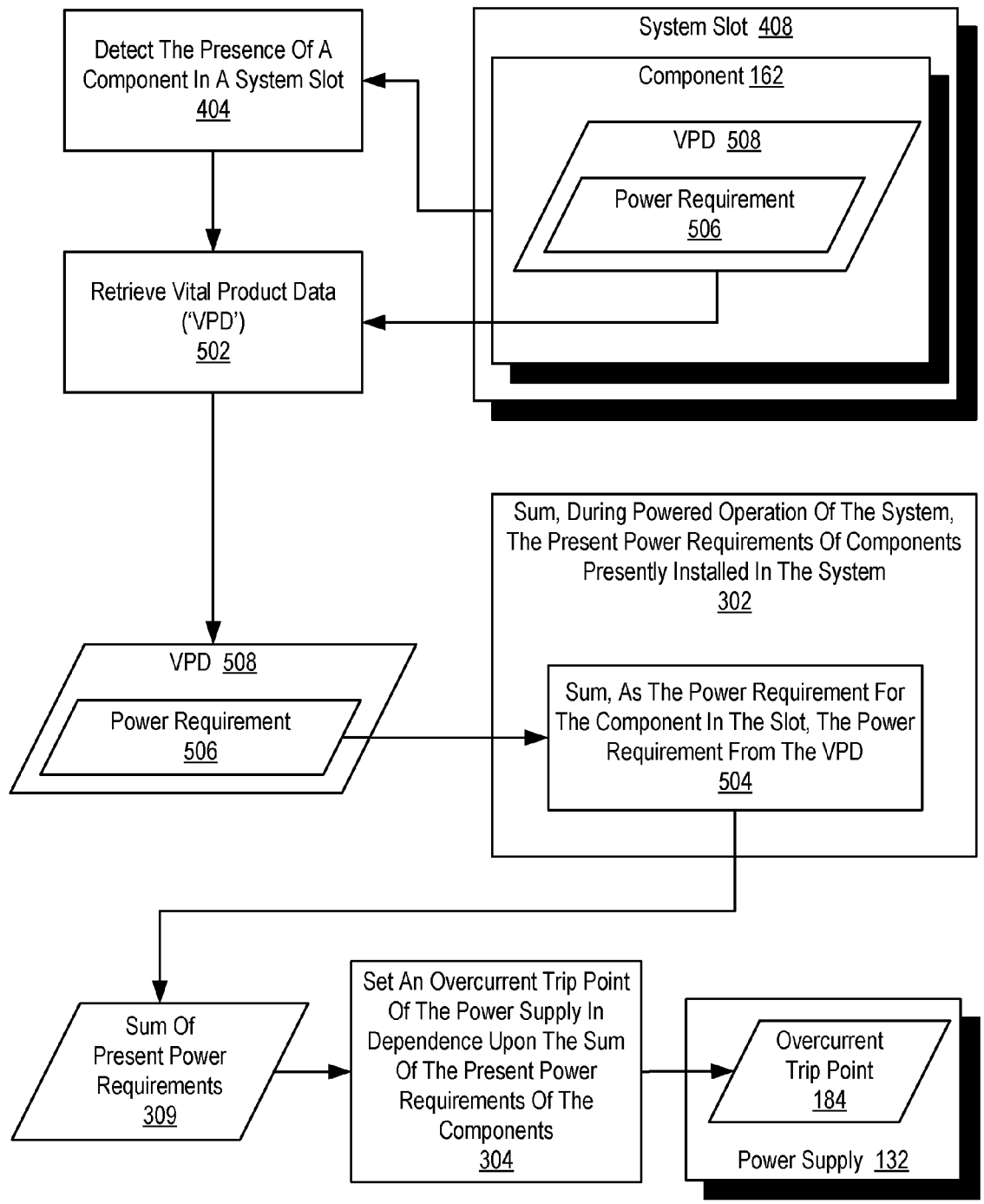
FIG. 5 sets forth a flow chart illustrating a further exemplary method for dynamically configuring overcurrent protection in a power supply according to embodiments of the present invention.

For further explanation, FIG. 5 sets forth a flow chart illustrating a further exemplary method for dynamically configuring overcurrent protection in a power supply according to embodiments of the present invention. The method of FIG. 5 is similar to the method of FIG. 3, including, as it does, summing the present power requirements of components presently installed in the system, setting an overcurrent trip point of the power supply, and so on, all of which operate in a manner similar to that described above for the method of FIG. 3. The method of FIG. 5, however, also includes detecting (404) the presence of a component (162) in a system slot (408). An electrically powered system may detect the presence of a component in a system slot by polling the slot for an indication of component presence, by recording the presence in the slot of a plug-and-play component at boot time, by detecting a hot swap of a component into the system slot, or by other methods as will occur to those of skill in the art.

The method of FIG. 5 also includes retrieving (502) vital product data ('VPD') from the component (162) in the slot (508). The VPD generally includes information about the component that allows the component to be administered at a system level, and in this example, the VPD includes a power requirement (506) for the component (162). As an alternative to retrieving VPD from the component itself, the VPD could also be retrieved from system memory elsewhere in the system, such as, for example, the power supply memory illustrated at reference (190) on FIG. 2. In the method of FIG. 5, summing (302) the present power requirements of components presently installed in the system is carried out by summing (504), as the power requirement for the component in the slot, the power requirement (506) from the VPD (508).

Figure 6:
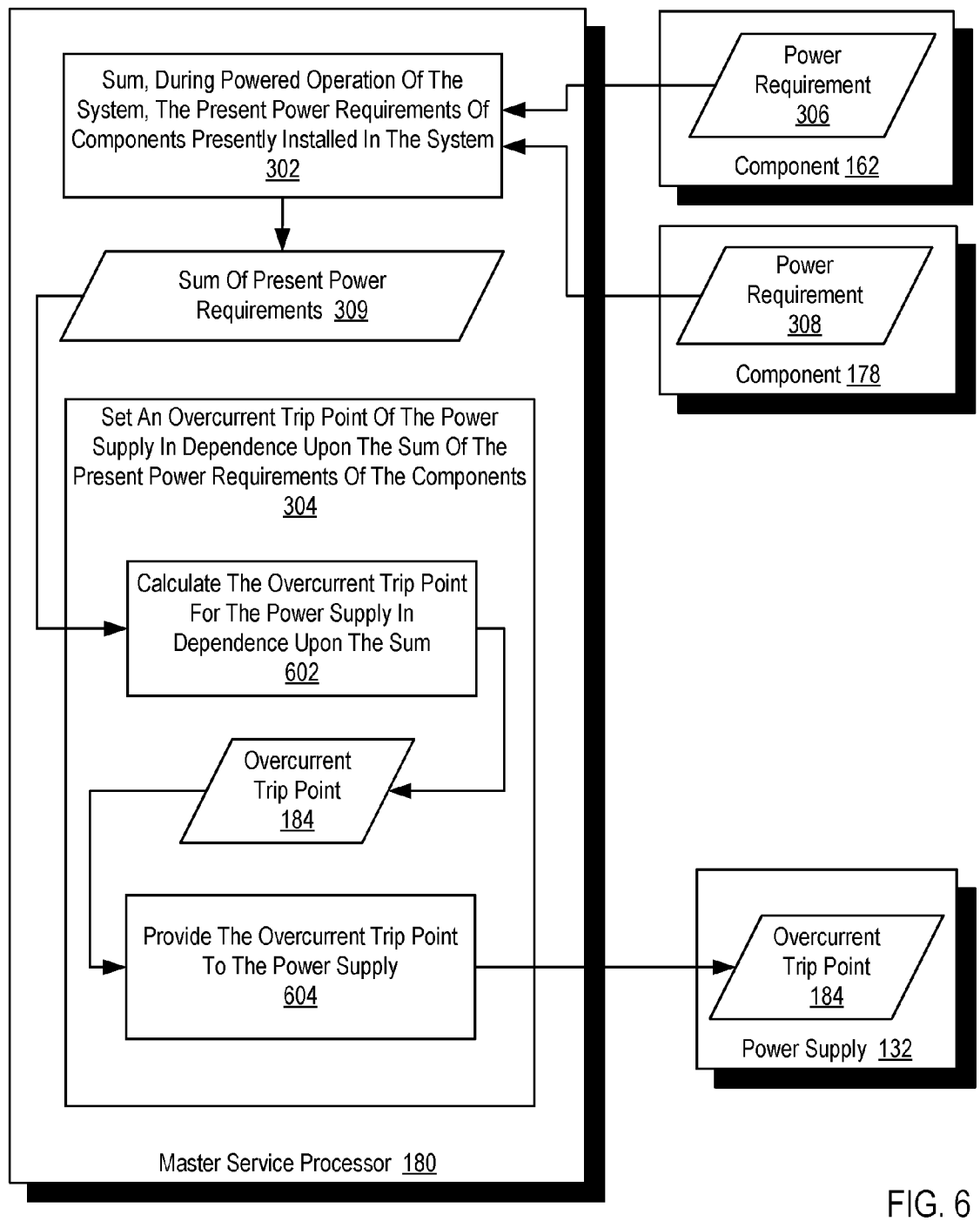
FIG. 6 sets forth a flow chart illustrating a further exemplary method for dynamically configuring overcurrent protection in a power supply according to embodiments of the present invention.

For further explanation, FIG. 6 sets forth a flow chart illustrating a further exemplary method for dynamically configuring overcurrent protection in a power supply according to embodiments of the present invention. The method of FIG. 6 is similar to the method of FIG. 3, including, as it does, summing the present power requirements of components presently installed in the system, setting an overcurrent trip point of the power supply, and so on, all of which operate in a manner similar to that described above for the method of FIG. 3. In the method of FIG. 6, however, the master service processor sets (304) an overcurrent trip point of the power supply in dependence upon the sum of the present power requirement of the components by calculating (602) the overcurrent trip point (184) for the power supply (132) in dependence upon the sum (309) and providing (604) the overcurrent trip point (184) to the power supply (132). The master service processor may provide the overcurrent trip point to the power supply through data communications on an out-of-band network such as the one illustrated, for example, and discussed above with reference to bus (196) on FIG. 2. The master service processor may calculate the overcurrent trip point for the power supply in various ways, including, for example:

In a system where more than one power supply module is run in parallel to provide power to the system, dividing the sum of the power requirements by the number of power supply modules. If two modules are providing power in parallel, for example, and the total power requirement is 500 watts, then calculate an overcurrent trip point of 250 watts and provide that value of overcurrent trip point to both power supply modules.

In a system with multiple power supply modules that uses only one power supply module at a time to provide all power to the system and reserves the other power supply modules as backups, calculate the overcurrent protection point as 110% of the sum of the present power requirements of components presently installed in the system, and provide that value of overcurrent trip point to the power supply modules.

Exemplary embodiments of the present invention are described largely in the context of a fully functional computer system for dynamically configuring overcurrent protection in a power supply. Readers of skill in the art will recognize, however, that the present invention also may be embodied in a computer program product disposed on computer readable, signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of dynamically configuring overcurrent protection in a power supply for components of an electrically powered system, the method comprising:
retrieving vital product data ('VPD') from a component in a system slot, the VPD comprising information about the component that allows the component to be administered at a system level, the VPD including a power requirement for the component;
summing by a master service processor, during powered operation of the system, the present power requirements of components presently installed in the system, including summing, as the power requirement for the component in the system slot, the power requirement from the VPD; and
setting by the master service processor an overcurrent trip point of the power supply in dependence upon the sum of the present power requirements of the components.

2. The method of claim 1 further comprising detecting by a master service processor a change in a configuration of the components of the electrically powered system, wherein the summing and the setting are carried out in response to the detecting.

3. The method of claim 1 further comprising summing by a service processor of a component, into a power requirement for the component, power requirements of devices in the component.

4. The method of claim 1 further comprising detecting the presence of a component in a system slot, wherein summing further comprises summing a predefined power requirement for the slot.

5. The method of claim 1 wherein setting by the master service processor an overcurrent trip point of the power supply in dependence upon the sum further comprises:
calculating the overcurrent trip point for the power supply in dependence upon the sum; and
providing the overcurrent trip point to the power supply.

6. An apparatus for dynamically configuring overcurrent protection in a power supply for components of an electrically powered system, the apparatus comprising a computer processor, a computer memory operatively coupled to the computer processor, the computer memory having disposed within it computer program instructions capable of:
retrieving vital product data ('VPD') from a component in a system slot, the VPD comprising information about the component that allows the component to be administered at a system level, the VPD including a power requirement for the component;
summing by a master service processor, during powered operation of the system, the present power requirements of components presently installed in the system, including summing, as the power requirement for the component in the system slot, the power requirement from the VPD; and
setting by the master service processor an overcurrent trip point of the power supply in dependence upon the sum of the present power requirements of the components.

7. The apparatus of claim 6 further comprising computer program instructions capable of detecting by a master service processor a change in a configuration of the components of the electrically powered system, wherein the summing and the setting are carried out in response to the detecting.

8. The apparatus of claim 6 further comprising computer program instructions capable of summing by a service processor of a component, into a power requirement for the component, power requirements of devices in the component.

9. The apparatus of claim 6 further comprising computer program instructions capable of detecting the presence of a component in a system slot, wherein summing further comprises summing a predefined power requirement for the slot.

10. The apparatus of claim 6 wherein setting by the master service processor an overcurrent trip point of the power supply in dependence upon the sum further comprises:
calculating the overcurrent trip point for he power supply in dependence upon the sum; and
providing the overcurrent trip point to the power supply.

11. A computer program product for dynamically configuring overcurrent protection in a power supply for components of an electrically powered system, the computer program product disposed upon a recordable, computer readable storage medium, the computer program product comprising computer program instructions capable of:
retrieving vital product data ('VPM') from a component in a system slot, the VPD comprising information about the component that allows the component to be administered at a system level, the VPD including a power requirement for the component;
summing by a master service processor, during powered operation of the system, the present power requirements of components presently installed in the system, including summing, as the power requirement for the component in the system slot, the power requirement from the VPD; and
setting by the master service processor an overcurrent trip point of the power supply in dependence upon the sum of the present power requirements of the components.

12. The computer program product of claim 11 further comprising computer program instructions capable of detecting by a master service processor a change in a configuration of the components of the electrically powered system, wherein the summing and the setting are carried out in response to the detecting.

13. The computer program product of claim 11 further comprising computer program instructions capable of summing by a service processor of a component, into a power requirement for the component, power requirements of devices in the component.

14. The computer program product of claim 11 further comprising computer program instructions capable of detecting the presence of a component in a system slot, wherein summing further comprises summing a predefined power requirement for the slot.

15. The computer program product of claim 11 wherein setting by the master service processor an overcurrent trip point of the power supply in dependence upon the sum further comprises:
calculating the overcurrent trip point for the power supply in dependence upon the sum; and
providing the overcurrent trip point to the power supply.

* * * * *